United States Patent [19]

Prisco et al.

[11] Patent Number: 4,599,513

[45] Date of Patent: Jul. 8, 1986

[54] ENCLOSURE FOR SORTING RADIOACTIVE MATERIAL

[75] Inventors: Anthony J. Prisco, Beverly; Alfred N. Johnson, Voorhees, both of N.J.

[73] Assignee: Westinghouse Electric Corp., Pittsburgh, Pa.

[21] Appl. No.: 648,779

[22] Filed: Sep. 10, 1984

[51] Int. Cl.[4] .......................... G21F 7/00; G01T 1/167

[52] U.S. Cl. .............................. 250/336.1; 250/515.1; 250/519.1

[58] Field of Search .................. 250/515.1, 519.1, 304, 250/336.1, 526, 381; 209/576, 589

[56] References Cited

U.S. PATENT DOCUMENTS 3,075,641 1/1963 Hutter et al. ......................... 209/74
4,020,346 4/1977 Dennis ............................. 250/519.1
4,194,634 3/1980 Kelly ................................. 209/589
4,365,719 12/1982 Kelly ................................. 209/589
4,427,894 1/1984 Sunaoshi et al. ................. 250/515.1

FOREIGN PATENT DOCUMENTS 3221469 12/1983 Fed. Rep. of Germany ...... 250/381

*Primary Examiner*—Carolyn E. Fields

[57] ABSTRACT

An enclosure for sorting materials having a low level of radioactivity contains a radiation detector and uses a blower to provide a negative atmosphere. Closures over holes in the floor of the enclosure can be opened to allow sorted material to be discharged into suitable receptacles such as barrels. A radiation shield is provided between the detector and the receptacles.

9 Claims, 6 Drawing Figures

FIG. 4
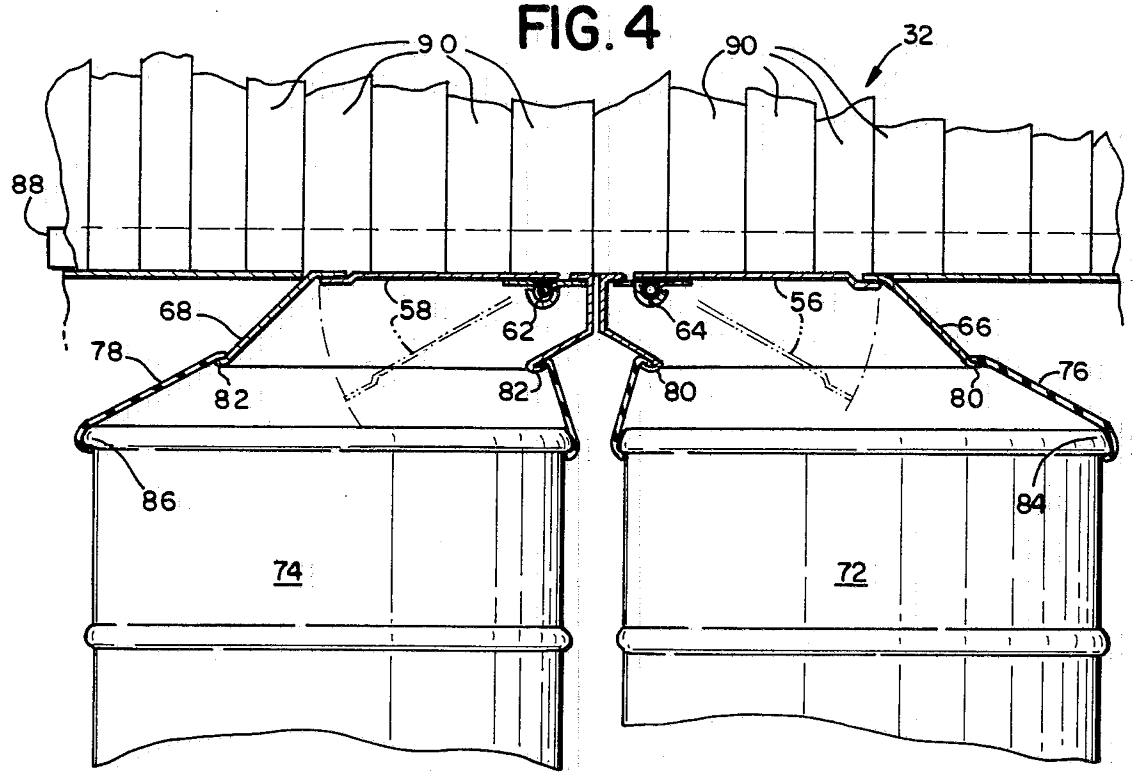
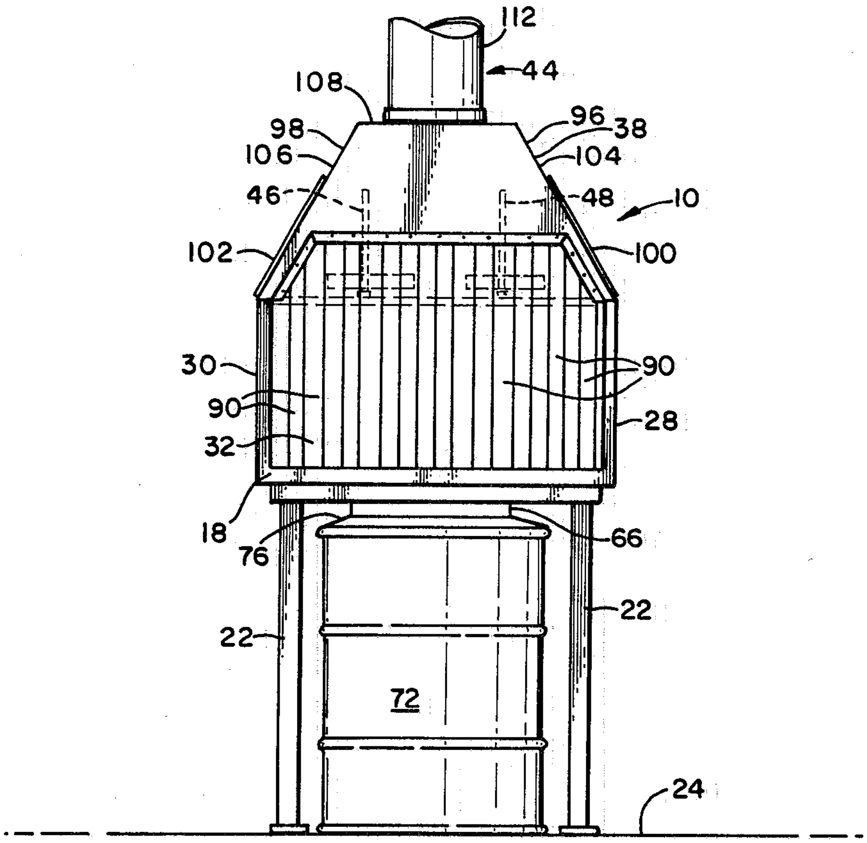
FIG. 3

ENCLOSURE FOR SORTING RADIOACTIVE MATERIAL

SUMMARY OF THE INVENTION

This invention relates to an enclosure for use while sorting materials that have low levels of radioactivity.

The enclosure includes a floor and a plurality of side walls and a roof. A means for detecting radiation is mounted within the enclosure. Means are provided for withdrawing air from the enclosure so that radioactive particles cannot leave the container to contaminate the surrounding area.

BACKGROUND OF THE INVENTION

This invention relates to an enclosure for use while sorting materials having a low level of radioactivity.

Waste having low levels of radioactivity is created at nuclear power plants and similar facilities. Typically, the waste comprises paper, fabrics, boots, clothing, tools and other items which can normally be expected to be used in the laboratories, offices, workshops and the like of a nuclear facility. The waste is collected in containers such as plastic bags to facilitate its handling. Prior to its disposal the waste is taken from the bags and passed through a series of inspections during which it is inspected for beta particle and gamma ray emissions.

To the extent that radioactive emissions above predetermined levels are detected, the waste is disposed of as hazardous by being buried at controlled disposal sites. Usually radiation in excess of two milliroentgens per hour indicates that a majority of the contents of a particular container are so highly contaminated that further sorting is usually not warranted.

Waste which exhibits radiation which is less than two milliroentgens per hour is subjected to closer inspection in an attempt to remove its nonradioactive components so that they can be reused where appropriate or treated as ordinary non-hazardous refuse. This reduces the volume of material that must be buried at controlled sites and provides an opportunity to recover valuable items.

An aspect of inspecting waste relates to an inspection for low level beta particle emission. This is because a failure to detect and remove articles that are low level beta particle emitters could result in injury of persons who are exposed to the radiation over a long period of time.

In order to minimize the radiation hazard to persons who are using the enclosure of the present invention, the waste is given a preliminary examination so that items exhibiting relatively high levels of radioactivity, i.e., over two milliroentgens per hour are removed. Further means can be provided for subsequent examination of articles even if only very low levels of radiation are detected in order to assure that all hazardous articles are removed.

A process for the preliminary examination of radioactive waste of which the method and apparatus disclosed herein can be a part is disclosed in co-pending patent application Ser. No. 648,780 entitled METHOD FOR SORTING RADIOACTIVE WASTE which was filed by Alfred N. Johnson and Anthony J. Prisco on Sept. 10, 1984.

The apparatus disclosed herein is operative to provide a safe environment for technicians as they manually sort materials having a low level of radioactivity. This is accomplished by providing a negative atmosphere in the enclosure so that radioactive particles cannot drift from the enclosure into the ambient air. Further, risk of hazard is reduced by virtue of the preliminary inspection of materials which is described in detail in the above mentioned co-pending patent application.

BRIEF DESCRIPTION OF THE DRAWINGS

FIG. 3 is an end elevation view of an enclosure constructed in accordance with the present invention.

FIG. 4 is a section view taken through line 4—4 of FIG. 2.

Figure 1:
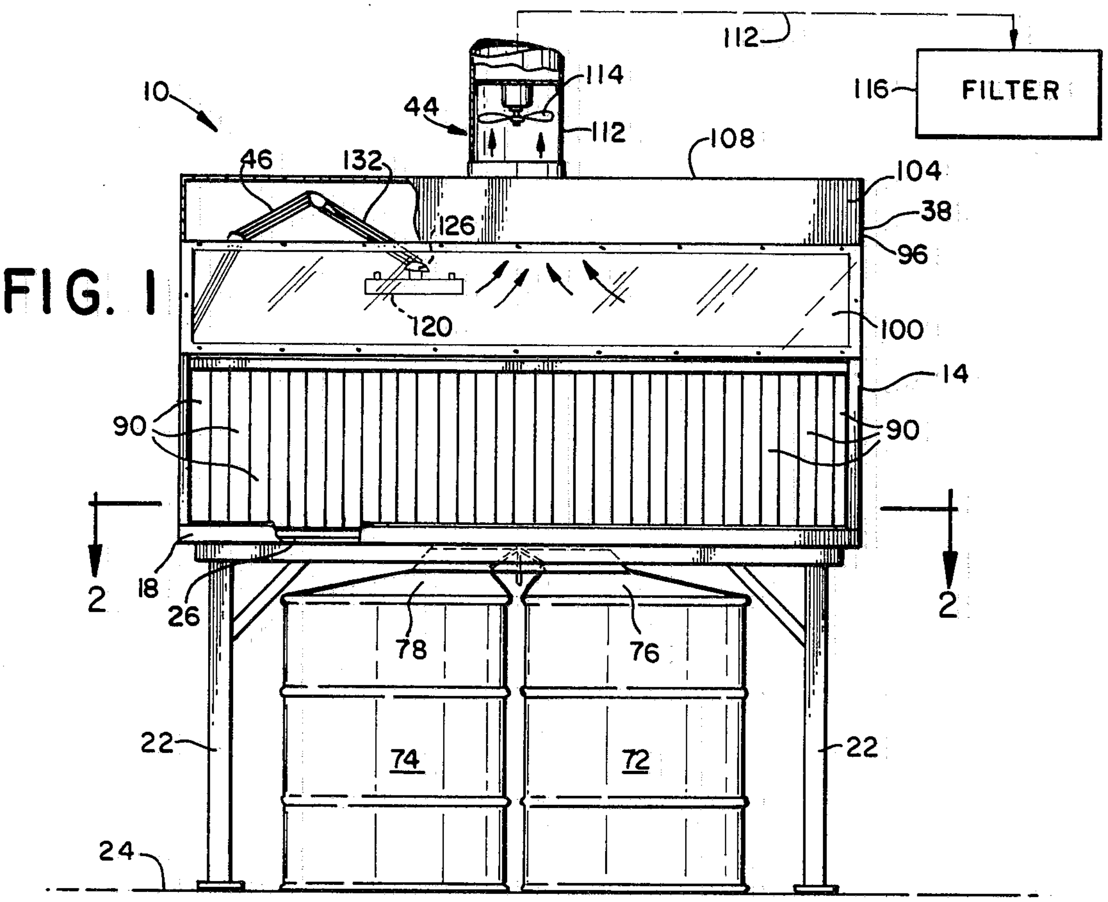
FIG. 1 is a side elevation view of an enclosure constructed in accordance with the presently preferred form of the invention.
Figure 2:
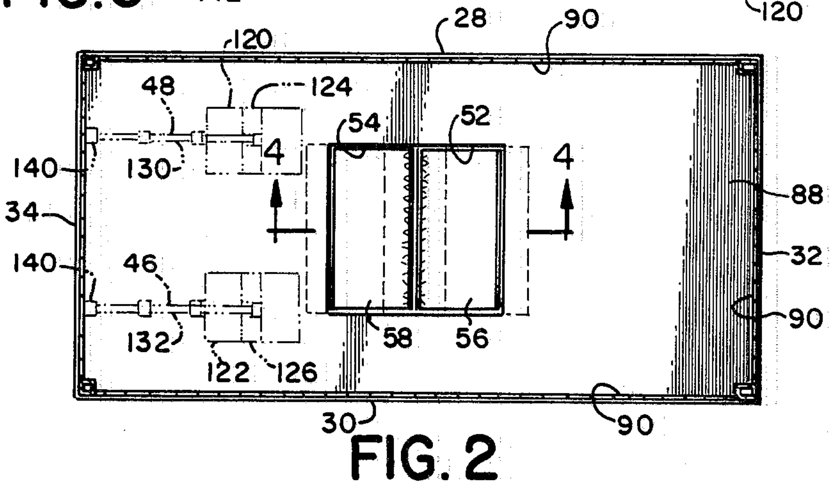
FIG. 2 is a section view taken along line 2—2 of FIG. 1.

Now referring to the drawings for a detailed description of the preferred embodiment of the invention. A device 10 illustrated in FIG. 1 is seen to include an enclosure 14 which comprises a floor 18 which is supported by a plurality of legs 22 above a suitable surface such as the ground 24. As best seen in FIGS. 2 and 4, the floor 18 is generally rectangular in configuration and is defined by the plurality of angle brackets disposed around its perimeter and a sheet of a suitable material such as stainless steel 26 supported thereby. The enclosure includes a plurality of side walls 28 and 30 and end walls 32 and 34 which are supported by the angle brackets. At their upper end the side walls support a roof 38.

Connected to the roof is an exhaust structure 44 which withdraws air from the enclosure thereby providing a slightly negative atmosphere therein.

Radiation detectors 46 and 48 may be mounted to the interior of the enclosure.

Preferably, two apertures 52 and 54 which may be generally rectangular in configuration and disposed in side by side relation are formed in a central portion of the floor 18. Each of the apertures includes a closure 56 and 58 which is biased to normally close the aperture by a suitable spring 62 and 64 which may be mounted on a suitable bracket below the floor.

Preferably, each of the apertures 52 and 54 is surrounded by a duct 66 and 68 which may be made out of sheet steel so that articles which are discharged through the apertures will be directed into suitable receptacles such as the barrels 72 and 74 which may be supported on the ground below the enclosure.

Relatively short, generally triangular conduits 76 and 78 which may be made of any suitable tough resilient air impervious material such as neoprene coated fabric, rubber, or the like may be arranged so that one of its ends overlies radially outwardly extending beads 80 and 82 at the lower end of each duct 56 and 58. Its other end overlies the uppermost beads 84 and 86 on each of the barrels 72 and 74 to provide a substantially airtight connection between the enclosure and the barrels.

The floor 18 of the enclosure may be lined with a layer of lead 88 in order to radiologically isolate radioactive materials that may be accumulated in the barrels 72 and 74 from the detectors 46 and 48 in the enclosures. The lead may be in the form of a solid sheet about one inch thick or it may be in form of blocks which are supported by the steel sheet 26.

The side and end walls 28, 30, 32 and 34 are comprised of a plurality of relatively narrow and long strips of translucent or transparent thermoplastic material 90. As best seen in FIGS. 2 and 4 the strips 90 lie in side by side relation with a portion of each strip overlying a portion of the next adjacent strip (FIG. 4).

As best seen in FIGS. 1 and 3 end walls 32 and 34 are substantially higher than side walls 28 and 30. To this extent, the elongated translucent strips 90 which are located on the end walls 30 and 32 are longer than the strips on the side walls. This feature enables containers of waste which are collected in bags or boxes to be easily inserted to the enclosure so their contents can be emptied onto floor 18. Also the enclosure to be coupled to other pieces of equipment since such other pieces of equipment can now be readily accomodated in the large opening defined by the walls 32 and 34.

The roof 38 is tapered to the extent that it includes sections 96 and 98 which are disposed at an angle to the horizontal. The lower portion of each roof section 96 and 98 comprises a transparent member 100 and 102 so that a technician standing along side of the enclosure can observe its interior. The upper portion 104 and 106 of each roof section 96 and 98 is connected to a generally horizontally extending portion 108 which may be provided with a suitable aperture in which air duct 112 is located. The aperture and duct 112 are part of the means 44 for withdrawing air from the enclosure mentioned earlier. A blower 114 disposed in duct 112 is arranged to withdraw air from the enclosure and the barrels 72 and 74 so that a slightly negative atmosphere is maintained within the system. The duct may be connected to a suitable commercially available filter 116 such as a high efficiency particulate filter which removes contaminated particles from the air before it is discharged. Typically, the filter is of the type which is known as a high efficiency particulate filter which is readily available commercially.

The negative atmosphere which is maintained in the system by the blower 114 prevents particles of radioactive material from drifting out of the enclosure 14.

The enclosure may include one or two of the aforementioned radiation detectors 46 and 48. The detectors may be any one of a plurality of well-known detectors which are suitable for detecting the presence of beta particles. Typically, the detectors are gas flow proportional detectors.

Each of the detectors 46 and 48 comprises a sensing head 120 and 122 which is releasably connected to arm end brackets 124 and 126 which are located at the ends of arms 130 and 132. Each releasable connection may include a rod 134 having a ball and socket connector 136 at its lower end in engagement with the sensing heads 120 and 122. At its upper end each of the rods 134 is retained in its respective arm end bracket 124 and 126 by a removable pin 138.

Figure 6:
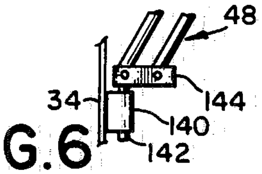
FIG. 6 is a side elevation view of the connection between the arms and the sensing heads.
Figure 5:
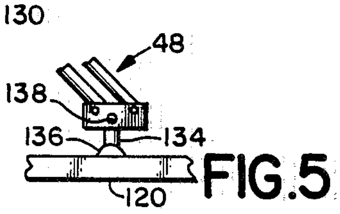
FIG. 5 is a side elevation view of the connection between the enclosure and the arms supporting the sensing heads.

The other end of each arm 130 and 132 is pivotally connected to the interior of the enclosure by a bracket such as bracket 140 (FIG. 6) which may be supported on end wall 34. The bracket 140 receives a pin 142 which depends from an arm end bracket 144 at the end of each arm. Each of the arms 130 and 132 is comprised of at least two sections which are pivoted to each other and which are interconnected by springs and the arm and brackets 124, 126 and 144 in a well-known manner so that the heads 120 and 122 can be positioned within the enclosure in predetermined locations by the technicians and will retain their orientation relative to an article unless they are pivoted to a new orientation by the technicians. The technicians can then bring articles which are to be examined into contact with the heads. In the alternative, pins 138 can be removed and the sensing heads 120 and 122 be released from arm end brackets 124 and 126 to be moved over the surface of the article being examined.

It is especially advantageous to use the gas proportional detectors since they are very sensitive to beta particle radiation and are relatively insensitive to gamma radiation. Accordingly, they can be used in an environment such as that disclosed with a minimum amount of shielding against background radiation. Thus, they can be used in areas with relatively high background gamma radiation.

In operation, the enclosure can be used as an independent installation for the examination and sorting of articles which are contaminated by relatively low levels of beta particle radioactivity with the intent of locating and removing those articles whose activity is higher than a permissible predetermined contamination level.

In the alternative, the enclosure can be used as part of the system which is described in the aforementioned co-pending application.

In either manner, the enclosure is used to sort waste from those containers which have been determined to contain waste having radiation levels not above the two milliroentgen level by preliminary screening.

The articles which survive that preliminary screening are then placed in the enclosure. They may be emptied from suitable plastic bags or other containers by merely being spilled on the floor 18 of the enclosure.

Each technician, after donning suitable attire which is recognized as necessary for working around radioactive materials, may stand along one of the sides 28 and 30 of the enclosure. The motor for blower 114 is energized in order to provide the negative atmosphere within the system. The technicians merely reach through the side walls by pushing aside the elongated translucent strips 90 to grasp the articles to be examined and the sensing heads 120 and 122. The sensing heads, as explained earlier, can be disconnected from the arms and passed over and around the articles to be examined or the articles can be brought up to the sensing head. Those articles which are considered to have a level of radioactive contamination above predetermined levels which is considered to be hazardous in the long term can be discharged through apertures 52 and 54 into barrels 72 and 74. The conduits 76 and 78 assure that no radioactive particles can escape when the materials are discharged into the barrels. The closures 56 and 58 return to their closed position after the articles are discharged through the apertures. Articles which are not considered to be hazardous can be discharged through one of the ends 32 and 34 of the sorting table for further examination.

As the level of radioactive material rises in the barrels 72 and 74, there is a risk that they would influence the sensing heads 120 and 122 so that those heads would give false readings during examination of articles. However, this problem is substantially eliminated by the provision of the layer of shielding 88 on the floor of the enclosure. In this regard, it should be apparent that the shielding need not be within the enclosure although that is preferred. The shielding may be located anywhere between the sensing heads 120 and 122 and the barrels 72 and 74 in order for it to achieve its intended results.

Further, the transparent members 100 and 102 of the roof make it easy for the technicians to observe the interior of the enclosure. Thus, they can observe the sensing heads and the articles which are to be examined at all times so as to know with precision which articles are causing the sensor heads to respond.

The enclosure is a relatively simple and easy to manufacture apparatus which is useful in the sorting of radioactive articles. It provides means for obtaining an accurate indication of the radioactivity of an article while providing an environment which is relatively safe for the technicians.

While the invention has been described with respect to a particular embodiment thereof, it is apparent that other forms and embodiments would be obvious to those skilled in the art. Thus, the scope of the invention should not be limited by the foregoing description, rather, only by the scope of the claims appended hereto.

We claim:

1. An enclosure for sorting materials having relatively low radioactivity comprising a floor, a plurality of side walls and a roof, at least one radiation detector disposed in said enclosure, said floor defining an aperture, a closure for said aperture, said closure being connected to said floor for movement between open and closed positions, means for urging said closure toward its closed position, means for receiving material which is discharged through said aperture, said means for receiving being disposed below said aperture so that material passing through said aperture is received by said means for receiving, means coupled to said enclosure for withdrawing the air therefrom, means for connecting said means for receiving to said means for withdrawing air from sid enclosure so that air can be withdrawn from said material receiving means, and means defining a shield, and means for supporting said shield between said radiation detector and said means for receiving material so that said radiation detector is shielded from radiation from radioactive material in said means for receiving material.

2. An enclosure as defined in claim 1 wherein at least one of said side walls comprises a plurality of yieldable members disposed adjacent each other to permit access to said enclosure.

3. An enclosure as defined in claim 2 wherein said yieldable members are elongated and are fastened at one end to said enclosure and a portion of each member overlies a portion of the next adjacent member to define said one side wall.

4. An enclosure as defined in claim 3 wherein said yieldable members are comprised of a thermoplastic.

5. An enclosure as defined in claim 3 wherein said yieldable members are translucent.

6. An enclosure as defined in claim 1 wherein said radiation detector is a beta particle detector.

7. An enclosure as defined in claim 6 including an arm, means for pivotally mounting one end of said arm to one of said walls of such enclosure, and means for releasably connecting said detector to the other end of said arm.

8. An enclosure as defined in claim 1 wherein at least a portion of said roof comprises a surface that is disposed at an angle to the horizontal and said last named portion is transparent.

9. An enclosure as defined in claim 1 including means for filtering radioactive particles, an inlet duct for being connected at one end to said means for filtering, the other end of said inlet duct being for connection to said means for withdrawing air from said enclosure so that said means for filtering can filter radioactive particles from the air withdrawn from said enclosure.

* * * * *